(12) United States Patent
Chu

(10) Patent No.: US 7,518,855 B2
(45) Date of Patent: Apr. 14, 2009

(54) DISPLAY APPARATUS WITH DETACHABLE BASE SUPPORT

(75) Inventor: Yi-Pai Chu, Taoyuan (TW)

(73) Assignee: BenQ Corporation, Taipei (TW)

( * ) Notice: Subject to any disclaimer, the term of this patent is extended or adjusted under 35 U.S.C. 154(b) by 122 days.

(21) Appl. No.: 11/676,650

(22) Filed: Feb. 20, 2007

(65) Prior Publication Data
US 2007/0197067 A1      Aug. 23, 2007

(30) Foreign Application Priority Data
Feb. 21, 2006     (TW) ............................... 95105777 A

(51) Int. Cl.
*H05K 5/00* (2006.01)
*H05K 7/00* (2006.01)
*G06F 1/16* (2006.01)

(52) U.S. Cl. .................................... 361/681; 248/125.1

(58) Field of Classification Search ................. 361/681, 361/682; 248/125.1, 917, 346.01, 346.06
See application file for complete search history.

(56) References Cited

U.S. PATENT DOCUMENTS

| | | | |
|---|---|---|---|
| 7,175,144 B2 * | 2/2007 | Yen et al. ................ | 248/221.11 |
| 7,361,046 B2 * | 4/2008 | Drew ......................... | 439/353 |
| 2004/0113031 A1 * | 6/2004 | Sung ........................ | 248/146 |
| 2006/0219849 A1 * | 10/2006 | Chiu ....................... | 248/125.8 |
| 2007/0008686 A1 * | 1/2007 | Jang ........................ | 361/681 |
| 2008/0089019 A1 * | 4/2008 | Li et al. ................... | 361/681 |

* cited by examiner

*Primary Examiner*—Hae Moon Hyeon

(57) ABSTRACT

A display apparatus with a detachable base support is provided. The display apparatus includes a display panel, a base, a support, and a latch. The base includes an accommodation area for accommodating the support and a protrusion, which is disposed on a sidewall around the accommodation area and projects toward a center of the accommodation area. The support includes a guiding portion and a receiving portion. The latch is movably coupled with the guiding portion to be selectively in a first position and a second position. As the latch is in the first position, the receiving portion is accessible for receiving the protrusion. When the protrusion is received in the receiving portion, the latch moves to the second position so that the receiving portion is inaccessible and the protrusion is confined within the receiving portion, whereby the support is mounted on the base and capable of supporting the display panel. The display apparatus further includes an elastic element for providing a force pushing the latch to the second position.

20 Claims, 6 Drawing Sheets

DISPLAY APPARATUS WITH DETACHABLE BASE SUPPORT

CROSS REFERENCE TO RELATED APPLICATIONS

This application claims the right of priority based on Taiwan Patent Application No. 095105777 entitled "Display Apparatus With Detachable base Support," filed on Feb. 21, 2006, which is incorporated herein by reference and assigned to the assignee hereof.

FIELD OF INVENTION

The present invention generally relates to a display apparatus and, more particularly, to a display apparatus with a detachable base support.

BACKGROUND OF THE INVENTION

Monitor devices play a very important role in the information system of modern society. One of many auxiliary components of the monitor device, such as a base support, is configured to support the monitor in a desired position and allow the monitor to provide different view angles for various occasions. As the size and weight of monitor devices increase with the development of technology, there is a demand to reinforce the strength of the base support for supporting the enlarged monitor device, and therefore the increase in dimension of the base support is inevitable. However, base supports of large scale increase the packing costs and occupy more space during transportation. Therefore, a detachable base support is proposed. The conventional detachable base support includes a support and a base plate. The support, which is connected to the base plate, is configured to support the monitor device.

Conventional detachable base supports generally employ hooks or screws cooperated with grooves to fix the support onto the base plate. These conventional connection mechanisms however lead to some problems. For example, using hooks to fix the support onto the base plate reduces the strength of a base support, so that the monitor device mounted on the base support sways easily. On the other hand, using screws to fix the support onto the base plate makes it difficult to detach them from each other. When the support needs to be detached from the base plate, auxiliary tools are required to remove the screws, which complicates the detachment process. Therefore, there is a need to provide a display apparatus with a detachable base support, which diminishes the problems described above.

SUMMARY OF THE INVENTION

One aspect of the present invention is to provide a display apparatus with a detachable base support, in which the support is detachable from the base so as to facilitate the transportability and the assembly procedure is simplified to increase productivity.

Another aspect of the present invention is to provide a display apparatus, which implements the mechanism of a latch to confine a protrusion of a support within a receiving portion of a base to reinforce the strength of connection between the support and the base and to simplify the assembly and/or disassembly processes.

A further aspect of the present invention is to provide a display apparatus, which employs an elastic element to provide a force pushing the latch to a desired position automatically.

In one embodiment of the present invention, the present invention provides a display apparatus, which includes a display panel, a support, a base, and a latch. The base includes an accommodation area for accommodating the support and a protrusion disposed on a sidewall around the accommodation area and projecting toward a center of the accommodation area. The support includes a guiding portion and a receiving portion. The latch movably couples with the guiding portion to be selectively in a first position and a second position. When the latch is in the first position, the receiving portion is accessible for receiving the protrusion. When the protrusion is received in the receiving portion, the latch moves to the second position so that the receiving portion is inaccessible and the protrusion is confined within the receiving portion, whereby the support is mounted on the base and capable of supporting the display panel.

In another embodiment, the display apparatus further includes an elastic element for providing a force pushing the latch to the second position. For example, when assembling the support with the base, the protrusion pushes the latch compressing the elastic element to be in the first position so that the receiving portion is accessible for receiving the protrusion. When the protrusion is received in the receiving portion, the elastic element provides a force pushing the latch to the second position. When disassembling the support from the base, an external force is applied to push the latch to the first position so that the receiving portion is accessible and the protrusion is allowed to move from the receiving portion, whereby the support is detachable from the accommodation area of the base. The support includes a connection unit for detachably connecting the display panel. Furthermore, the latch includes a connection part for coupling with the elastic element. The support includes a positioning part for positioning the elastic element.

The latch further includes an engaging part, and the guiding portion includes a groove for engaging with the engaging part so that the latch moves along the groove to the first position or the second position. The latch further includes a rough surface for increasing friction when a user operates the latch. The support further includes an auxiliary receiving portion, and the base includes an auxiliary protrusion. The auxiliary protrusion is received in the auxiliary receiving portion when the protrusion is received in the receiving portion.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1:
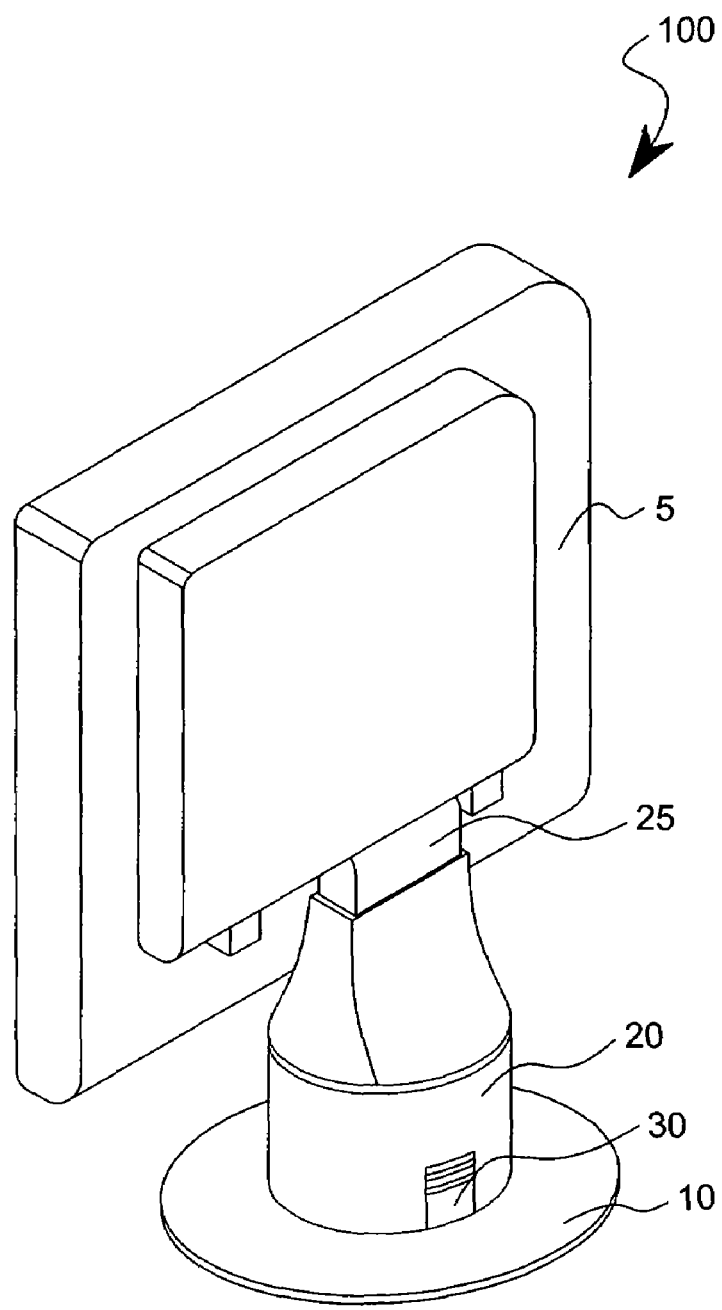
FIG. 1 illustrates a schematic view of an assembled display apparatus in accordance with one embodiment of the present invention.

The present invention provides a display apparatus with a detachable base support. For better understanding, a power connector or other accessory components are not illustrated in the drawings. However, in practice, the display apparatus may include other components, such as means for connecting other electronic device when implementing the present invention. Please refer to the following descriptions in conjunction with the accompanying drawings, FIGS. 1-6.

Figure 2:
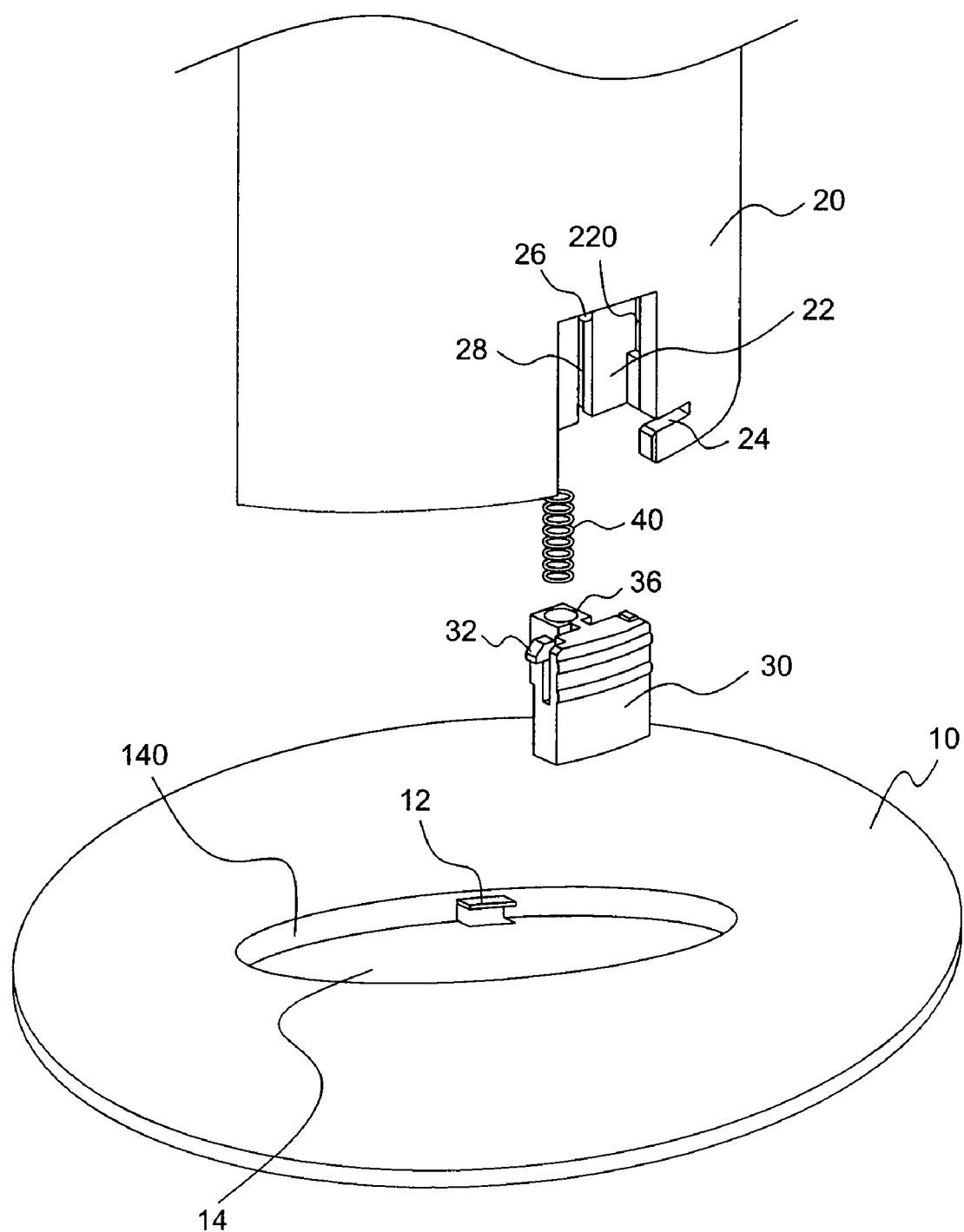
FIG. 2 illustrates a schematic view of exemplary components in accordance with one embodiment of the present invention.

FIG. 1 illustrates an assembled display apparatus 100 in accordance with one embodiment of the present invention. In one embodiment, the display apparatus 100 includes a display panel 5, a base 10, a support 20, and a latch 30. The display apparatus 100 may be a flat panel monitor or any other devices as appropriate, such as a flat panel television. The display panel is configured to display related information. FIG. 2 illustrates exemplary components in one embodiment of the present invention. Please note that the display panel 5 is not shown in FIG. 2 for better explanation of the connection between the base 10 and the support 20. The base 10 includes an accommodation area 14 and a protrusion 12, and the support includes a guiding portion 22, a receiving portion 24 (see FIG. 2), and a connection unit 25 (see FIG. 1). The connection unit 25 is configured to detachably connect the display panel 5 and disposed on an opposite end of the support 20 with respect to the guiding portion 22 and the receiving portion 24. The accommodation area 14 is configured to accommodate the support 20. The accommodation area 14 has a shape designed in accordance with the shape of the support 20 so as to allow movement or rotation while initially assembling the support 20 and the base 10. In one embodiment, the accommodation area 14 can be a recess region in the base 10. As shown in FIG. 2, the accommodation area 14 is designed to be a round area to comply with the shape of the support 20. The accommodation area 14 is designed to have a diameter slightly larger than that of the support 20. Therefore, when the support 20 is initially assembled with the base 10, the support 20 is allowed to rotate within the accommodation area 14. Moreover, the protrusion 12 is disposed on a sidewall 140 around the accommodation area 14 and projects toward a center of the accommodation area 14. In other words, when the base 10 is assembled with the support 20, the protrusion 12 serves as an engaging unit for engaging with the receiving portion 24 of the support 20. It is noted that the accommodation area 14 is not limited to the exemplary recess region shown in FIG. 2. In another embodiment, the base 10 may have a structure with sidewall 140 protruding from the base 10 to define the accommodation area 14.

The latch 30 movably couples with the guiding portion 22 to be selectively in a first position and a second position. When the latch 30 moves to the first position, the receiving portion 24 is accessible for receiving the protrusion 12. When the protrusion 12 is received in the receiving portion 24, the latch 30 moves to the second position so that the receiving portion 24 is inaccessible to confine the protrusion 12 within the receiving portion 24. Consequently, the support 20 is mounted on the base 10 and configured to connect and support the display panel 5 by use of the connection unit 25, as shown in FIG. 1.

Figure 3:
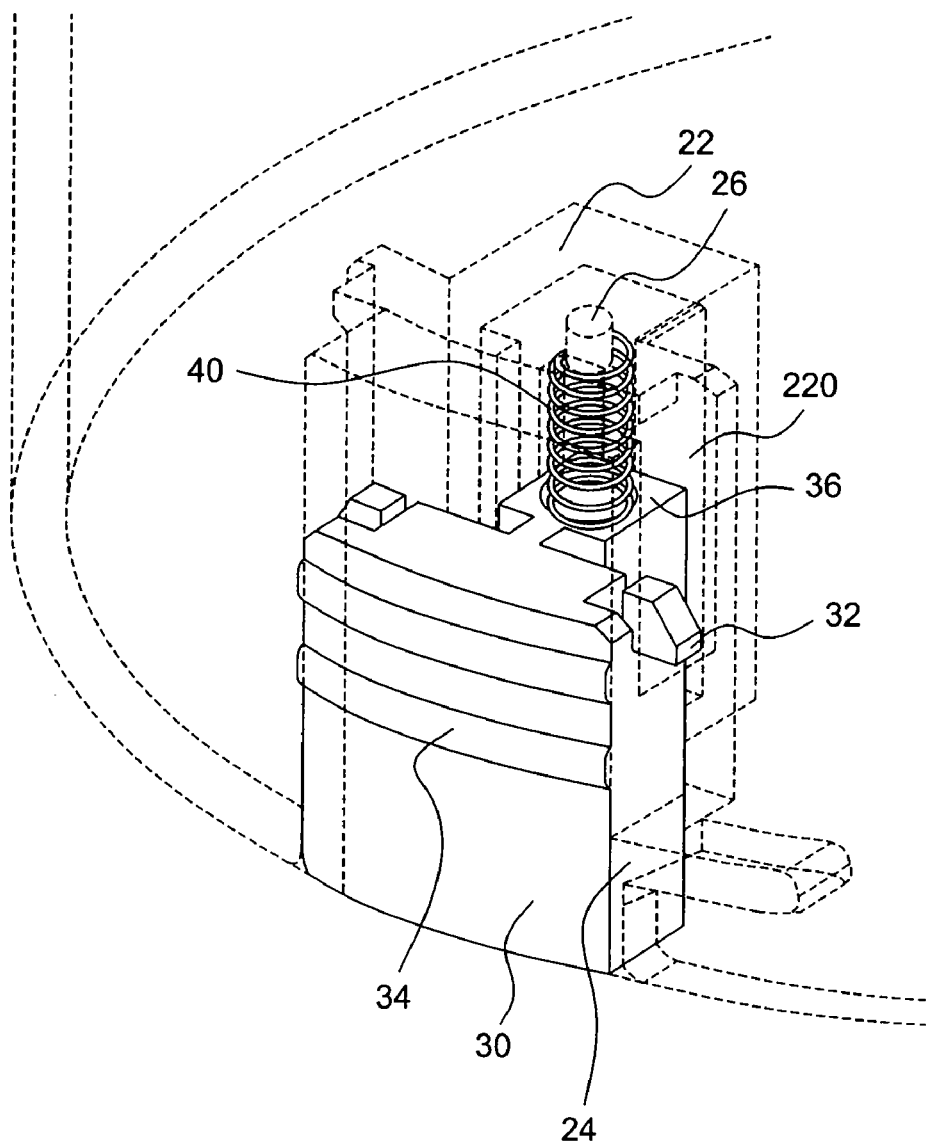
FIG. 3 illustrates a schematic view of assembling a latch with a support in accordance with one embodiment of the present invention.
Figure 4A:
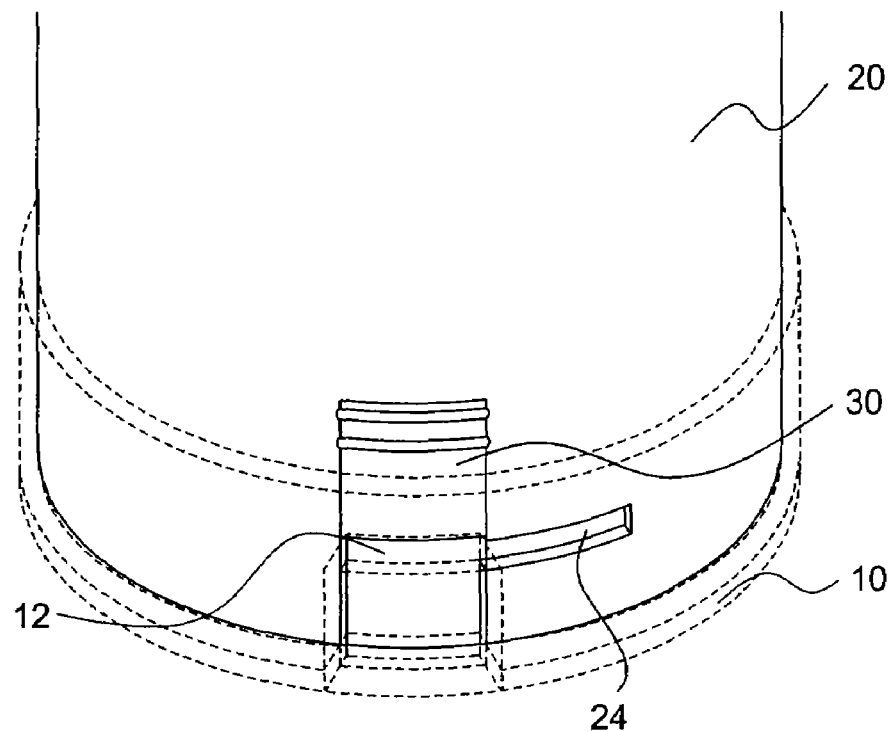
FIGS. 4A and 4B illustrate schematic views respectively showing a latch in a first position and a second position in accordance with one embodiment of the present invention.
Figure 4B:
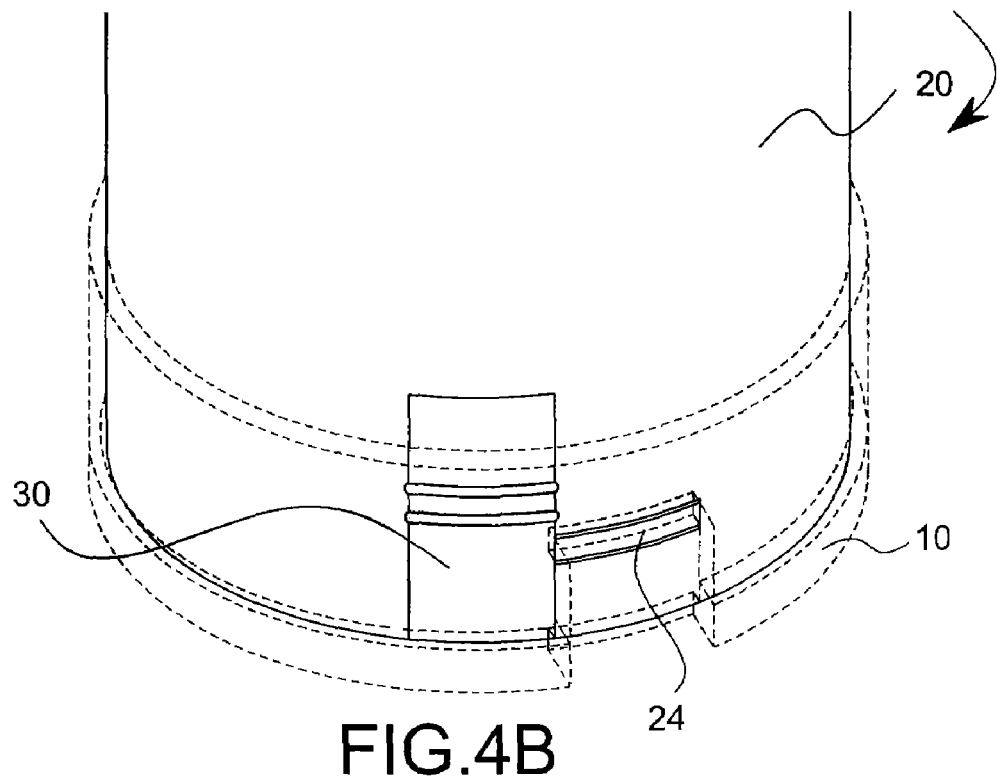
Figure 5:
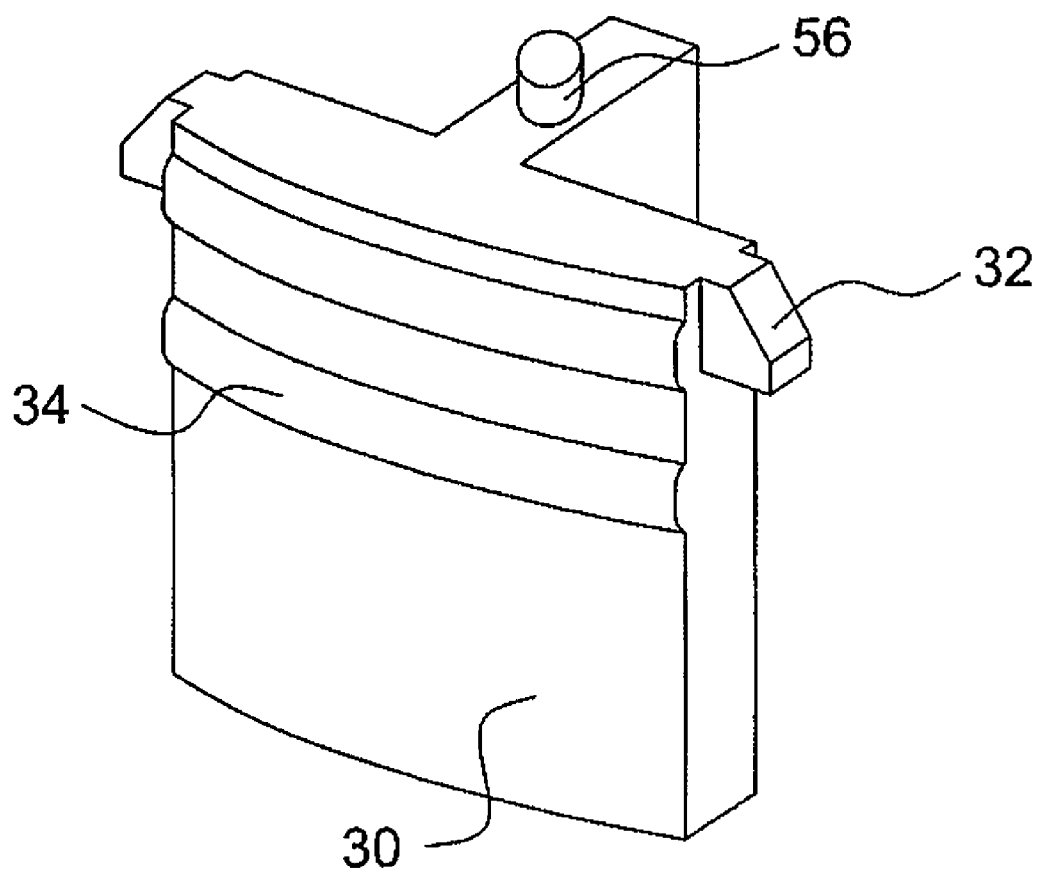
FIG. 5 illustrates a schematic view of an exemplary latch in accordance with another embodiment of the present invention.

Referring to FIG. 3, the assembly of the latch 30 and the support 20 in accordance with one embodiment of the present invention is shown. In one exemplary embodiment, the support 20 is a circular column stricture. Alternatively, by modifying the base and the support, the support may have a rectangular shape according to different design needs. Referring to FIG. 2 and FIG. 3, the guiding portion 22 of the support 20 is an opening structure on the columnar sidewall. The guiding portion 22 includes a groove 220. The receiving portion 24 can be a slot or a slit in the columnar sidewall adjacent to the opening structure. The latch 30 includes an engaging part 32 (for example, a hook-like element) for engaging with the guiding portion 22 so that the latch 30 can be mounted onto the support 20. In other words, by engaging the engaging part 32 with the groove 220, the latch 30 can move along the groove 220 to the first position or the second position. As shown in FIG. 4A, when the latch 30 is in the first position, the receiving portion 24 is accessible for receiving the protrusion 12. Referring to FIG. 4B, when the latch 30 is in the second position, the latch 30 blocks the opening of the receiving portion 24, and making the receiving portion 24 inaccessible. Additionally, according to different appearance requirements, the latch 30 may be designed to have a corresponding geometric shape when assembled with the support 20. Moreover, in consideration of reinforcing the connection strength between the support 20 and the base 10, one end of the latch 30 is preferably coplanar with one end of the support 20 when the latch 30 is in the second position. Furthermore, the latch 30 may include a rough surface 34, such as a plurality of raised bars, for increasing friction when a user operates the latch 30.

For example, when a user intends to assemble the support 20 with the base 10, the support 20 is aligned with the base 10. That is, the protrusion 12 of the base 10 is aligned with the latch 30, which is previously mounted on the support 20. When the support 20 is moving toward the base 10, the protrusion 12 touches against the latch 30 and then pushes the latch 30 to the first position so that the support 20 is accommodated in the accommodation area 14 of the base 10 and the opening of the receiving portion 24 of the support 20 is aligned with the protrusion 12 (as shown in FIG. 4A). By rotating the support 20 or the base 10, the protrusion 12 can be received in the receiving portion 24. For example, when the support 20 rotates clockwise, the protrusion 12 moves toward the opening into the receiving portion 24 (as shown in FIG. 4B). Preferably, the receiving portion 24 may have a shape corresponding to the protrusion 12 so that the protrusion 12 is moveably engaged with the receiving portion 24 and has a minimum movement when it is received in the receiving portion 24. When the protrusion 12 is received in the receiving portion 24, the latch 30 moves to the second position so as to further limit the lateral movement of the protrusion 12. In other words, the movement of the protrusion 12 is limited by the shape of the receiving portion 24 and further by the latch 30 so that the protrusion 12 is confined within the receiving portion 24 and not able to move out of the receiving portion 24 through the path it moves in. Consequently, due to the engagement of the protrusion 12 and the receiving portion 24, the support 20 cannot be detached from the accommodation area 14 of the base 10 and is configured to support the display panel 5 on a supporting plane, such as a desk or a shelf.

When the user intends to detach the support 20 from the base, the user may apply a force to push the latch 30 to the first position so that the receiving portion 24 is accessible. Without the latch 30 blocking the moving path, the support 20 may rotate reversely (counterclockwise) so that the protrusion 12 is allowed to move out of the receiving portion 24. Therefore, the support 20 can be easily detached from the accommodation area 14 of the base 10.

In another embodiment, the display apparatus further includes an elastic element 40, such as a spring, for providing a force pushing the latch 30 to the second position. As shown in FIG. 2, the latch 30 further includes a connection part 36 for coupling with the elastic element 40. The connection part 36 may have a different design in accordance with the elastic element 40. As shown in FIG. 2, the exemplary connection part 36 of the latch 30 can be a pillar with a recess area or a protruded portion 56 (see FIG. 5). The elastic element 40 may be disposed in the recess area of the pillar or accommodated on the protruded portion 56. The support 20 may further include a positioning part 26 for positioning one end of the elastic element 40. For example, the positioning part 26 may be a protruded portion disposed on the guiding portion 22 (as shown in FIG. 3). When the elastic element 40 is implemented, the positioning part 26 of the support 20 and/or the connection part 36 of the latch 30 can be employed to maintain the elastic element 40 in a desired position during deformation. Referring to FIG. 2, the guiding portion 22 may further include a guiding slot 28 for guiding the movement of the latch 30. For example, when the latch 30 is mounted on the support 20, the engaging part 32 is movably coupled with the groove 220, and the connection part 36 is disposed to movably couple with the guiding slot 28 so as to enhance the stability of the latch 30 during operation.

For example, when the latch 30 is mounted on the support 20, the elastic element 40 is positioned in a desired position by use of the positioning part 26 and/or the connection part 36 and provides a force pushing the latch 30 to the second position. When the user intends to assemble the support 20 with the base 10, the latch 30 is initially aligned with the protrusion 12 and the support 20 is pushed toward the base 10 to provide an external force against the elastic element 40, so that the protrusion 12 pushes the latch 30 in a first direction (upwardly or vertically) to compress the elastic element 40, and the latch 30 moves to the first position to make the receiving portion 24 accessible for receiving the protrusion 12. When the latch 30 is in the first position, the support 20 is accommodated in the accommodation area 14 of the base 10, and the protrusion 12 is aligned with the opening of the receiving portion 24. By rotating the support 20 or the base 10, the protrusion 12 moves from a second direction (i.e. laterally), which is different from the first direction, to be received in the receiving portion 24. When the protrusion 12 is received in the receiving portion 24, the user releases the latch 30 so that the elastic element 40 can restore to its original status pushing the latch 30 downwardly to the second position. Consequently, the receiving portion 24 is inaccessible and the protrusion 12 is confined within the receiving portion 24 due to the block of the latch 30. Furthermore, because the latch 30 is designed to be coplanar with one end of the support 20, the latch 30 is also limited by the sidewall 140 around the accommodation area 14 so that the connection between the support 20 and the base 10 is enhanced.

When the user intends to detach the support 20 from the base 10, the user may exert a force to push the latch 30 moving upwardly to the first position so that the receiving portion 24 is accessible. Without the latch 30 blocking the path, the protrusion 12 may moves out of the receiving portion 24 by rotating the support 20 or the base 10 reversely. Therefore, the support 20 can be removed from the accommodation area 14 and accordingly detached from the base 10.

Figure 6:
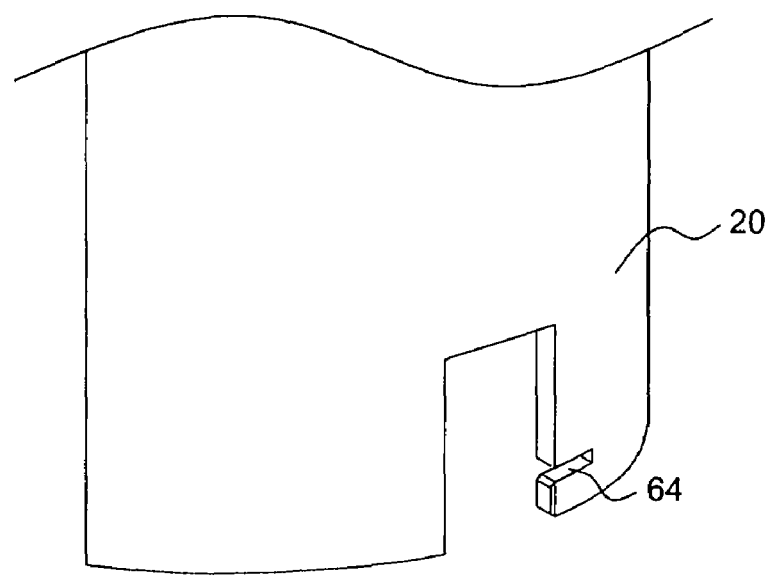
FIG. 6 illustrates a schematic view of a support and a base in accordance with another embodiment of the present invention.
Figure 6:
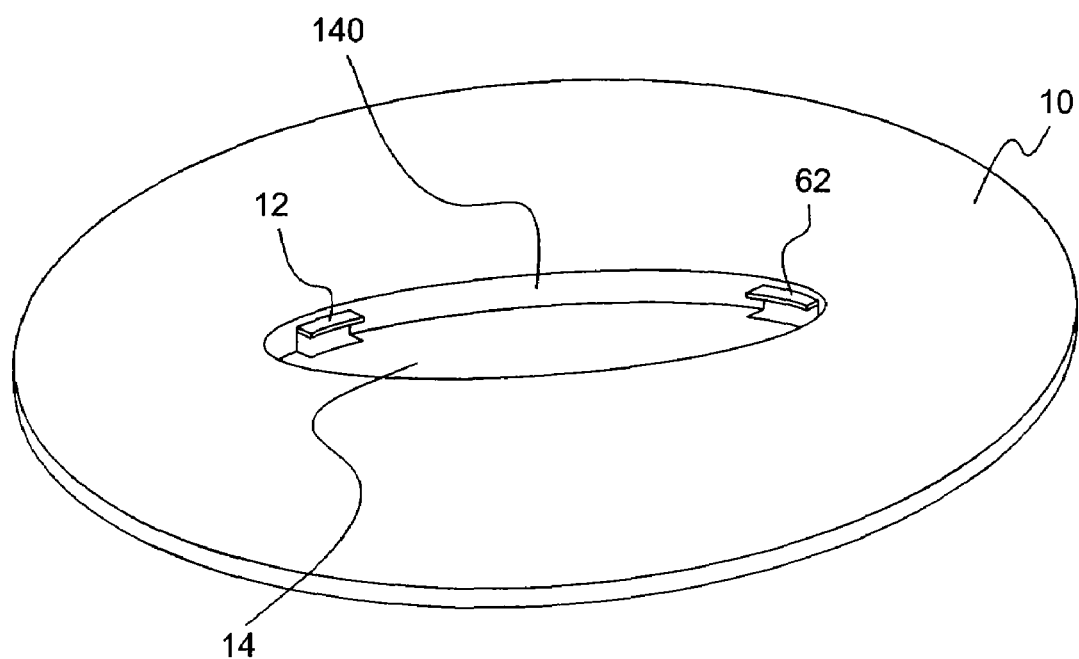

Referring to FIG. 6, in another embodiment, the support 20 further includes an auxiliary receiving portion 64, and the base 10 further includes an auxiliary protrusion 62. For example, the support 20 may have two receiving portions 24 and 64, which are disposed on opposite sides. That is, the receiving portion 24 is disposed opposite to the auxiliary receiving portion 64 (as shown in FIG. 6). The base 10 may have two protrusions 12 and 62, which are disposed to correspond to the receiving portions 24 and 64. When the support 20 is initially assembled with the base 10, one of the protrusions (i.e. the protrusion 12) is aligned with the receiving portion adjacent to the latch 30 (i.e. the receiving portion 24), and the other protrusion (i.e. the protrusion 64) is aligned with the other receiving portion (i.e. the receiving portion 64). When the support 20 or the base 10 rotates, the two protrusions 12 and 62 are concurrently received in the receiving portions 24 and 64, respectively. In such an arrangement, the connection between the support 20 and the base 10 can be significantly enhanced, and the stability of supporting the display panel 5 is also improved.

It is noted that though the elastic element is illustrated in the drawings, the present invention may be implemented without using the elastic element by modifying the designs of the support and the latch. For example, the latch may be designed without the connection part, and the support doesn't have the positioning part. Furthermore, the number of the latch can be more than one. When multiple latches are implemented, the corresponding protrusions are preferably disposed evenly on the sidewall to further improve the connection between the support and the base. Moreover, the number of the auxiliary receiving portion and the auxiliary protrusion is not limited to the embodiment. Additionally, the connection between the support and the display panel is not limited to the components illustrated in the embodiment.

Although specific embodiments have been illustrated and described, it will be obvious to those skilled in the art that various modifications may be made without departing from what is intended to be limited solely by the appended claims.

What is claimed is:

1. A display apparatus, comprising:
   a display panel;
   a support comprising a guiding portion and a receiving portion formed at a bottom end of said support;
   a base comprising an accommodation area for accommodating said bottom end, and a protrusion disposed on a sidewall around said accommodation area and projecting toward a center of said accommodation area; and
   a latch movably coupling with said guiding portion to be selectively positioned in one of a first position and a second position,
   wherein when said latch is in said first position, said receiving portion is accessible for receiving said protrusion, and when said protrusion is received in said receiving portion, said latch moves to said second position so that said receiving portion is inaccessible and said protrusion is confined within said receiving portion, whereby said support is mounted on said base and capable of supporting said display panel.

2. The display apparatus of claim 1, further comprising an elastic element compressed between said support and said latch, said elastic element providing a force pushing said latch toward said second position.

3. The display apparatus of claim 2, wherein said latch further comprises a connection part for coupling said latch with said elastic element.

4. The display apparatus of claim 2, wherein said support further comprises a positioning part for positioning said elastic element onto said support.

5. The display apparatus of claim 1, wherein said support is detachable from said accommodation area of said base when said latch positioned in said first position to make said receiving portion accessible and said protrusion is allowed to remove from said receiving portion.

6. The display apparatus of claim 1, wherein said latch comprises an engaging part and said guiding portion comprises a groove for engaging with said engaging part so that said latch moves along said groove to said first position or said second position.

7. The display apparatus of claim 1, wherein said latch further comprises a rough surface for increasing friction when a user operates said latch.

8. The display apparatus of claim 1, wherein said support further comprises an auxiliary receiving portion, said base further comprises an auxiliary protrusion, and said auxiliary protrusion is received in said auxiliary receiving portion when said protrusion is received in said receiving portion.

9. The display apparatus of claim 1, wherein said accommodation area of said base comprises a round area.

10. The display apparatus of claim 1, wherein the guiding portion substantially vertically extends to said bottom end, and the receiving portion substantially horizontally extends from said guiding portion.

11. The display apparatus of claim 1, wherein the dimension of the receiving portion is substantially corresponding to the dimension of the protrusion, so that the protrusion movement is limited when the protrusion is received within the receiving portion.

12. A display apparatus, comprising:
a display panel;
a support comprising a guiding portion and a receiving portion formed at a bottom end of said support;
a base comprising an accommodation area for accommodating said bottom end and a protrusion disposed on a sidewall around said accommodation area and projecting toward a center of said accommodation area;
a latch movably coupling with said guiding portion to be selectively positioned in one of a first position and a second position; and
an elastic element compressed between said support and said latch,
wherein when inserting said bottom end into said accommodation area, said protrusion pushes said latch in a first direction from said second position toward said first position such that said receiving portion is accessible for receiving said protrusion;
wherein when said protrusion is completely received in said receiving portion, said elastic element provides a force pushing said latch from said first position toward said second position so that said receiving portion is inaccessible and said protrusion is confined within said receiving portion, whereby said support is mounted on said base and capable of supporting said display panel.

13. The display apparatus of claim 12, wherein said latch further comprises a connection part for coupling said latch with said elastic element.

14. The display apparatus of claim 12, wherein said support further comprises a positioning part for positioning said elastic element onto said support.

15. The display apparatus of claim 12, wherein said latch comprises an engaging part and said guiding portion comprises a groove for engaging with said engaging part so that said latch moves along said groove to said first position or said second position.

16. The display apparatus of claim 12, wherein said latch further comprises a rough surface for increasing friction when a user operates said latch.

17. The display apparatus of claim 12, wherein said accommodation area of said base comprises a round area.

18. The display apparatus of claim 12, wherein said support further comprises an auxiliary receiving portion, said base further comprises an auxiliary protrusion, and said auxiliary protrusion is received in said auxiliary receiving portion when said protrusion is received in said receiving portion.

19. The display apparatus of claim 12, wherein the dimension of the receiving portion is substantially corresponding to the dimension of the protrusion, so that the protrusion movement is limited when the protrusion is received in the receiving portion.

20. The display apparatus of claim 12, wherein the guiding portion substantially vertically extends to said bottom end, and the receiving portion substantially horizontally extends from said guiding portion.

\* \* \* \* \*